United States Patent
Garabandic

(10) Patent No.: US 10,305,285 B2
(45) Date of Patent: May 28, 2019

(54) PHOTOVOLTAIC VOLTAGE REGULATION

(71) Applicant: SCHNEIDER ELECTRIC SOLAR INVERTERS USA, INC., Livermore, CA (US)

(72) Inventor: Djordje Garabandic, Burnaby (CA)

(73) Assignee: SCHNEIDER ELECTRIC SOLAR INVERTERS USA, INC., Livermore, CA (US)

( * ) Notice: Subject to any disclaimer, the term of this patent is extended or adjusted under 35 U.S.C. 154(b) by 0 days.

(21) Appl. No.: 15/948,377

(22) Filed: Apr. 9, 2018

(65) Prior Publication Data

US 2018/0358811 A1    Dec. 13, 2018

Related U.S. Application Data

(62) Division of application No. 14/870,306, filed on Sep. 30, 2015, now Pat. No. 9,941,701, which is a division
(Continued)

(51) Int. Cl.
*H02J 3/38* (2006.01)
*H02J 3/46* (2006.01)
(Continued)

(52) U.S. Cl.
CPC ............ *H02J 3/383* (2013.01); *H02J 3/46* (2013.01); *H02S 40/32* (2014.12); *H02S 40/34* (2014.12);
(Continued)

(58) Field of Classification Search
CPC .. H02J 3/383; H02J 3/46; H02S 40/32; H02S 40/34; H02S 50/00; Y02E 10/563
See application file for complete search history.

(56) References Cited

U.S. PATENT DOCUMENTS 6,593,520 B2  7/2003  Kondo et al.
8,334,618 B2  12/2012 Bhavaraju et al.
(Continued)

FOREIGN PATENT DOCUMENTS

CN  101636847 A  1/2010
EP  2325984 A1  5/2011
(Continued)

OTHER PUBLICATIONS

Extended European Search Report (European Search Report & Euro-pean Search Opinion) dated Jun. 2, 2015 for European Application No. EP12792092.4, 5 pgs.
(Continued)

*Primary Examiner* — Daniel J Cavallari
(74) *Attorney, Agent, or Firm* — Lando & Anastasi, LLP

(57) ABSTRACT

A photovoltaic system includes: a photovoltaic generator comprising strings that each includes one or more photovoltaic cells; a power converter; switches; and a controller. The power converter is configured to convert direct current (DC) power provided by the photovoltaic generator into alternating current (AC) power, and to output the AC power. Each switch is associated with one of the strings and is configured to connect the associated string to the power converter when set to a first setting, such that power generated by the first string can flow to the power converter. Each switch is also configured to disconnect the string from the power converter when set to a second setting. The controller is configured to control the power provided by the photovoltaic generator by selectively connecting the strings of the photovoltaic generator to the power converter by controlling the settings of the switches.

18 Claims, 13 Drawing Sheets

Related U.S. Application Data of application No. 13/152,787, filed on Jun. 3, 2011, now Pat. No. 9,184,594.

(51) Int. Cl.
  *H02S 40/32* (2014.01)
  *H02S 40/34* (2014.01)
  *H02S 50/00* (2014.01)

(52) U.S. Cl.
  CPC ............ *H02S 50/00* (2013.01); *Y02E 10/563* (2013.01); *Y10T 307/724* (2015.04)

(56) References Cited

U.S. PATENT DOCUMENTS

| | | |
|---|---|---|
| 8,624,561 B1 | 1/2014 | Slavin |
| 2001/0023703 A1 | 9/2001 | Kondo et al. |
| 2003/0066555 A1 | 4/2003 | Hui et al. |
| 2009/0027932 A1 | 1/2009 | Haines et al. |
| 2011/0025130 A1 | 2/2011 | Hadar et al. |
| 2011/0216562 A1 | 9/2011 | Gengenbach |
| 2011/0298292 A1 | 12/2011 | Bremicker et al. |
| 2012/0139347 A1 | 6/2012 | Hackenberg |
| 2012/0161527 A1 | 6/2012 | Casey et al. |
| 2013/0038129 A1* | 2/2013 | Bundschuh ....... H01L 31/02021 307/80 |
| 2013/0058140 A1 | 3/2013 | Victor et al. |
| 2013/0140911 A1 | 6/2013 | Hightower et al. |
| 2013/0241294 A1 | 9/2013 | Cleland |
| 2017/0194791 A1 | 7/2017 | Budde |

FOREIGN PATENT DOCUMENTS

| | | |
|---|---|---|
| JP | H07-177652 A | 7/1995 |
| WO | 2010078303 A2 | 7/2010 |
| WO | 2011014274 A1 | 2/2011 |
| WO | 2011015587 A2 | 2/2011 |

OTHER PUBLICATIONS

International Preliminary Report on Patentability for International Application No. PCT/US2012/039978, dated Dec. 19, 2013, 7 pgs.
International Search Report and Written Opinion, PCT/US2012/039978, dated Dec. 26, 2012.
State Intellectual Property Office of the P.R.C. (SIPO) 1st Office Action and Search Report for Application No. 2012800384867 dated Jul. 2, 2015, 5 pgs. [translation not yet available].

* cited by examiner

Feed Forward Method for Controlling the Strings

Ramp up photovoltaic voltage at inverter startup

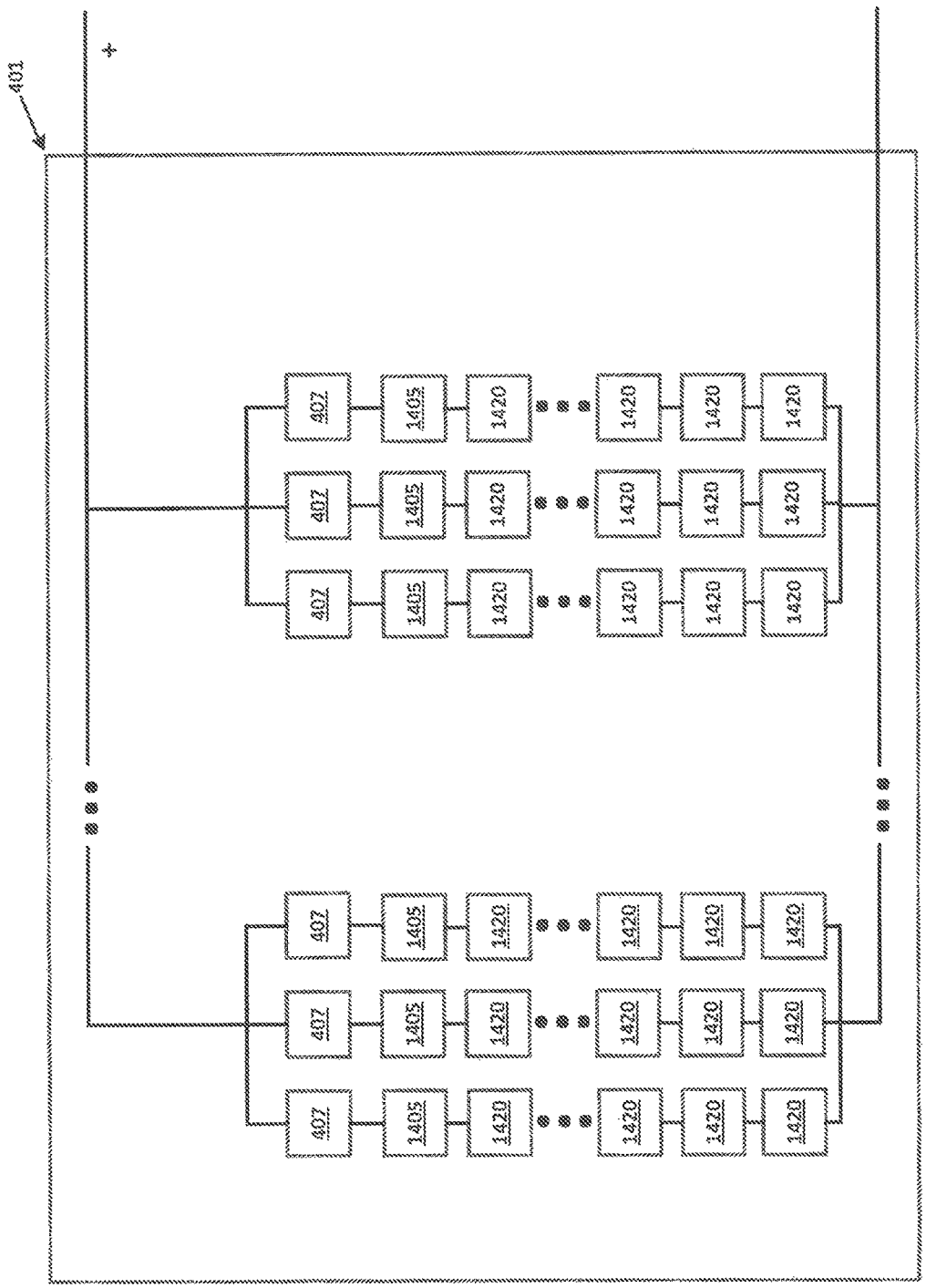

PHOTOVOLTAIC VOLTAGE REGULATION

CROSS-REFERENCE TO RELATED APPLICATIONS

This application is a divisional of U.S. application Ser. No. 14/870,306 [now U.S. Pat. No. 9,941,701], filed Sep. 30, 2015, and entitled "PHOTOVOLTAIC VOLTAGE REGULATION," which is a divisional of U.S. application Ser. No. 13/152,787 [now U.S. Pat. No. 9,184,594], filed Jun. 3, 2011, and entitled "PHOTOVOLTAIC VOLTAGE REGULATION," each of which is hereby incorporated by reference.

BACKGROUND

Photovoltaic systems use solar cells to convert light into electricity. A typical photovoltaic system includes several components, including photovoltaic cells, mechanical and electrical connections, mountings, and controllers for regulating and/or modifying the electrical current produced by the photovoltaic system.

The following terms are used herein to describe various components and/or operational aspects of photovoltaic systems:

| | |
|---|---|
| PV | photovoltaic |
| DC | direct current |
| AC | alternate current |
| $V_{OC}$ | open circuit voltage |
| $V_{GRID}$ | grid voltage |
| $V_{NOM}$ | nominal grid voltage |
| $I_{GRID}$ | grid current |

FIG. 1 is a functional block diagram of a typical PV system 100. The photovoltaic system 100 includes a photovoltaic generator 101 that converts sunlight into electricity. In a conventional PV system, such as the photovoltaic system 100, the voltage generated by the system can be controlled by extracting an appropriate amount of power from the PV generator 101, passing the power from the PV generator 101 to a power converter 102 through to a power sink 103. According to an embodiment, the power converter 102 can comprise an electronic power converter. In a typical implementation, the power sink 103 is the electrical power grid (sometimes also referred to as the power "mains"). The grid comprises an electrical network for generating, transmitting, controlling, and distributing power from power generators to power consumers at various service locations across the network. The power converter 102 converts DC power provided by the PV generator 101 into AC power that can be distributed on the grid.

FIG. 2 is a more detailed block diagram of a conventional PV power system 200 that can be used to implement the system illustrated in FIG. 1. The PV power system 200 includes a solar cell array 201 that comprises solar cells (also referred to as photovoltaic cells). The solar cells are solid state devices that convert the energy of sunlight directly into electricity by the photovoltaic effect. The solar cells generate DC voltage.

The solar cell array 201 is coupled to a DC switch 202. The DC switch 202 can be closed to connect the solar cell array 201 to DC capacitor bank 204, or opened to disconnect the solar cell array 201 from the DC capacitor bank 204. When the DC switch 202 is closed and the solar cell array 201 is generating power, the solar cell array 201 can provide power to charge the DC capacitor bank 204. The DC capacitor bank 204 is also connected to an inverter 205.

The inverter 205 converts the DC voltage output from the capacitor bank 204 into a 3-phase (or in some cases 2-phase) pulsed AC voltage. The inverter 205 outputs pulsed AC current to a filter 206. The filter 206 converts the pulsed AC current output by the inverter 205 into a sinusoidal AC voltage. The sinusoidal AC voltage can then be output to a mains power grid 209. If an AC mains switch 207 is closed, the sinusoidal AC voltage output by the filter 206 is received by the power transformer 208. The power transformer 208 adapts the voltage output by the PV system 200 to the grid voltage. This configuration allows the PV system 200 to output electricity onto the mains grid 209. The voltage output by the photovoltaic system 200 is no higher than the grid voltage.

Controlling the voltage generated by a PV generator such as the solar cell array 201 is important because it can help to (a) increase the power generated by the solar panels, and (b) reduce the voltage stress on the power converter. If the power sink 103, such as the grid 209, is unable to absorb the available power produced by the PV generator 101, the PV voltage will increase toward the open circuit level ($V_{OC}$) and will ultimately produce an increased voltage stress on the power converter 102. In conventional systems, this is addressed by "overdesigning" the power converter, such that the power converter 101 can reliably operate with the PV open circuit voltage levels. Overdesigned systems have lower efficiency and higher complexity than systems that are not overdesigned.

FIG. 3 illustrates an alternative approach that conventional systems have used to address these issues. A PV power system 300 includes a pre-load 304 in the form of a dissipative resistive load parallel to a PV generator 301. In the event that a power sink 303 is unable to absorb the power generated by the PV generator 301, the pre-load 304 can be activated to supplement the power sink and to maintain the PV voltage at levels that are safe for power converter 302. The use of a pre-load 304, however, can be prohibitively expensive and can pose a fire risk.

SUMMARY

Techniques are described for regulating the voltage generated by a photovoltaic system. For example, a photovoltaic system includes a photovoltaic generator that includes photovoltaic cells arranged in strings. A configurable string controller can detect events where the voltage produced by the photovoltaic generator should be regulated and selectively connect or disconnect the strings to regulate the voltage provided by the photovoltaic generator.

An example of a photovoltaic system includes: a photovoltaic generator includes strings that each includes one or more photovoltaic cells; a power converter; switches; and a controller. The power converter is configured to convert direct current (DC) power provided by the photovoltaic generator into alternating current (AC) power, and to output the AC power. Each switch is associated with one of the strings and is configured to connect the associated string to the power converter when set to a first setting, such that power generated by the first string can flow to the power converter. Each switch is also configured to disconnect the string from the power converter when set to a second setting. The controller is configured to control the power provided by the photovoltaic generator by selectively connecting the strings of the photovoltaic generator to the power converter by controlling the settings of the switches.

Implementation of the photovoltaic system may include one or more of the following features. The controller is configured to monitor the voltage of a power sink, and the controller is configured to decrease the power provided by the photovoltaic generator to the power converter by selectively disconnecting strings of the photovoltaic generator in response to a decrease in voltage of the power sink. The controller is configured to increase the power provided by the photovoltaic generator to the power converter by selectively disconnecting strings of the photovoltaic generator in response to an increase voltage of the power sink. The controller includes a tangible, non-transitory computer-readable memory, modules comprising processor executable code stored in the memory, a processor connected to the memory and configured to access the modules stored in the memory, and a control interface configured to send control signals to the switches. The modules include a voltage control module, a string selection module, and a control signal module. The voltage control module is configured to cause the processor to: monitor the voltage of the power sink to identify changes in the voltage of the power sink and to determine whether to connect or disconnect one or more strings of the photovoltaic generator, to adjust the power provided by the photovoltaic generator, in response to a change in voltage of the power sink. The string selection module is configured to cause the processor to select one or more strings of the photovoltaic generator in response to be connected or disconnected based on a determination by the voltage control module that one or more strings of the photovoltaic generator should be connected or disconnected in response to a change in voltage of the power sink. The control signal module is configured to cause the processor to send control signals to the switches to cause the one or more strings to be connected to the power converter or to be disconnected from the power converter. The controller is further configured to: receive an inverter startup signal indicating that the power converter is in a startup period during which power provided by the photovoltaic generator is to be gradually ramped up, to disconnect any strings in excess of strings used to provide startup voltage, and to iteratively connect strings to gradually increase power provided by the photovoltaic generator.

An example of a method for controlling the power output of a photovoltaic system includes: receiving an inverter startup signal indicating that a power converter of the photovoltaic system is in a startup period during which power provided by the photovoltaic generator is to be gradually ramped up; disconnecting any strings in excess of strings used to provide startup voltage; and iteratively connecting strings to gradually increase power provided by the photovoltaic generator. The photovoltaic system includes a photovoltaic generator that includes strings where each string includes one or more photovoltaic cells.

Implementations of such a method may include one or more of the following features. Each string is associated with a switch, and disconnecting any strings in excess of strings used to provide startup voltage include sending a control signal to each of the switches, associated with each of the strings to be disconnected, to disconnect the strings from the power converter. Connecting the strings to adjust the photovoltaic voltage provided by the photovoltaic generator includes sending a control signal to each of the switches, associated with each of the strings to be connected, to connect the strings to the power converter.

An example of a method for controlling the power output of a photovoltaic system is includes: monitoring a voltage of a power sink associated with the photovoltaic system; determining whether the voltage of the power sink has decreased, and in response to the voltage of the power sink decreasing: calculating a percentage of the voltage of the power sink relative to a nominal level associated with the power sink, the nominal level representing a desired voltage level for the power sink, calculating a number of strings of the photovoltaic generator to be disconnected to decrease a photovoltaic voltage provided by the photovoltaic generator, wherein disconnecting the string prevents power generated by the string from reaching a power converter of the photovoltaic system that converts direct current (DC) power to alternating current (AC) power expected by the power sink, and disconnecting the calculated number of strings to adjust the photovoltaic voltage provided by the photovoltaic generator. The photovoltaic system photovoltaic system includes a photovoltaic generator that includes strings where each string includes one or more photovoltaic cells.

Implementations of such a method may include one or more of the following features. Determining whether the voltage of the power sink has increased, and in response to the voltage of the power sink increasing: calculating a percentage of the voltage of the power sink relative to a nominal level associated with the power sink, the nominal level representing a desired voltage level for the power sink, and calculating a number of strings of the photovoltaic generator to be connected to decrease a photovoltaic voltage provided by the photovoltaic generator, where connecting the string allows power generated by the string to reach the power converter of the photovoltaic system, and connecting the calculated number of strings to increase the photovoltaic voltage provided by the photovoltaic generator. The voltage of the power sink decreases as a result of a low voltage ride through (LVRT) event, and reducing the voltage of the photovoltaic generator by an amount proportional to the decrease in voltage of the power sink. The voltage of the power sink increases after the LRVT event, and increasing the voltage provided by the photovoltaic generator by an amount proportional to the increase in voltage of the power sink. Each string is associated with a switch, and where disconnecting the calculated number of strings to adjust the photovoltaic voltage provided by the photovoltaic generator includes sending a control signal to the switches associated with each of the strings to be disconnected to disconnect the strings from the power converter. Connecting the calculated number of strings to adjust the photovoltaic voltage provided by the photovoltaic generator includes sending a control signal to the switches associated with each of the strings to be connected to connect the strings to the power converter.

An example of a method for controlling the power output of a photovoltaic system includes: determining a voltage of a power sink associated with the photovoltaic system; determining a reference voltage for the photovoltaic generator, the reference voltage representing a desired voltage for the photovoltaic generator; determining a current voltage for the photovoltaic generator; determining a difference between the reference voltage and the current voltage; calculating a number of strings of the photovoltaic generator to connect or disconnect based on the difference, wherein disconnecting the string prevents power generated by the string from reaching a power converter of the photovoltaic system that converts direct current (DC) power to alternating current (AC) power expected by the power sink. Connecting the string allows power generated by the string to reach the power converter of the photovoltaic system. The method also includes connecting or disconnecting the calculated number of strings to adjust the photovoltaic voltage provided by the photovoltaic generator. The photovoltaic system photovoltaic system includes a photovoltaic generator that includes strings where each string includes one or more photovoltaic cells.

Implementations of such a method may include one or more of the following features. Each string is associated with a switch, and where disconnecting the strings to adjust the photovoltaic voltage provided by the photovoltaic generator includes sending a control signal to the switches associated with each of the strings to be disconnected to disconnect the strings from the power converter. Connecting the strings to adjust the photovoltaic voltage provided by the photovoltaic generator includes sending a control signal to the switches associated with each of the strings to be connected to connect the strings to the power converter.

An example system for controlling the power output of a photovoltaic system includes a photovoltaic generator that includes strings where each string includes one or more photovoltaic cells. The system includes means for receiving an inverter startup signal indicating that a power converter of the photovoltaic system is in a startup period during which power provided by the photovoltaic generator is to be gradually ramped up; means for disconnecting any strings in excess of strings used to provide startup voltage; and means for iteratively connecting strings to gradually increase power provided by the photovoltaic generator.

Implementations of the system for controlling the power output of a photovoltaic system may include one or more of the following features. Each string is associated with a switch, and the means for disconnecting any strings in excess of strings used to provide startup voltage further comprises means for sending a control signal to each of the switches associated with each of the strings to be disconnected to disconnect the strings from the power converter. The means for connecting the strings to adjust the photovoltaic voltage provided by the photovoltaic generator further comprises means for sending a control signal to each of the switches associated with each of the strings to be connected to connect the strings to the power converter.

An example system for controlling the power output of a photovoltaic system includes a photovoltaic generator that includes strings where each string includes one or more photovoltaic cells. The system includes means for monitoring a voltage of a power sink associated with the photovoltaic system; means for determining whether the voltage of the power sink has decreased, and in response to the voltage of the power sink decreasing: means for calculating a percentage of the voltage of the power sink relative to a nominal level associated with the power sink, the nominal level representing a desired voltage level for the power sink, means for calculating a number strings of the photovoltaic generator to be disconnected to decrease a photovoltaic voltage provided by the photovoltaic generator, wherein disconnecting the string prevents power generated by the string from reaching a power converter of the photovoltaic system that converts direct current (DC) power to alternating current (AC) power expected by the power sink, and means for disconnecting the calculated number of strings to adjust the photovoltaic voltage provided by the photovoltaic generator.

Implementations of the system for controlling the power output of a photovoltaic system may include one or more of the following features. The system includes means for determining whether the voltage of the power sink has increased, and in response to the voltage of the power sink increasing the means for determining whether the voltage of the power sink has increased includes: means for calculating a percentage of the voltage of the power sink relative to a nominal level associated with the power sink, the nominal level representing a desired voltage level for the power sink; means for calculating a number strings of the photovoltaic generator to be connected to decrease a photovoltaic voltage provided by the photovoltaic generator, wherein connecting the string allows power generated by the string to reach the power converter of the photovoltaic system; and means for connecting the calculated number of strings to increase the photovoltaic voltage provided by the photovoltaic generator. The voltage of the power sink decreases as a result of a low voltage ride through (LVRT) event, and the system includes means for reducing the voltage of the photovoltaic generator by an amount proportional to the decrease in voltage of the power sink. The voltage of the power sink increases after the LRVT event, and the system includes means for increasing the voltage provided by the photovoltaic generator by an amount proportional to the increase in voltage of the power sink. Each string is associated with a switch, and the means for disconnecting the calculated number of strings to adjust the photovoltaic voltage provided by the photovoltaic generator includes means for sending a control signal to the switches associated with each of the strings to be disconnected to disconnect the strings from the power converter. The means for connecting the calculated number of strings to adjust the photovoltaic voltage provided by the photovoltaic generator further comprises means for sending a control signal to the switches associated with each of the strings to be connected to connect the strings to the power converter.

An example system for controlling the power output of a photovoltaic system includes a photovoltaic generator that includes strings where each string includes one or more photovoltaic cells. The system includes means for determining a voltage of a power sink associated with the photovoltaic system; means for determining a reference voltage for the photovoltaic generator, the reference voltage representing a desired voltage for the photovoltaic generator; means for determining a current voltage for the photovoltaic generator; means for determining a difference between the reference voltage and the current voltage; means for calculating a number of strings of the photovoltaic generator to connect or disconnect based on the difference, wherein disconnecting the string prevents power generated by the string from reaching a power converter of the photovoltaic system that converts direct current (DC) power to alternating current (AC) power expected by the power sink, and wherein connecting the string allows power generated by the string to reach the power converter of the photovoltaic system; and means for connecting or disconnecting the calculated number of strings to adjust the photovoltaic voltage provided by the photovoltaic generator.

Implementations of the system for controlling the power output of a photovoltaic system may include one or more of the following features. Each string is associated with a switch, and the means for disconnecting the strings to adjust the photovoltaic voltage provided by the photovoltaic generator comprises means for sending a control signal to the switches associated with each of the strings to be disconnected to disconnect the strings from the power converter. The means for connecting the strings to adjust the photovoltaic voltage provided by the photovoltaic generator comprises means for sending a control signal to the switches associated with each of the strings to be connected to connect the strings to the power converter.

BRIEF DESCRIPTION OF THE DRAWINGS

FIG. 15 is a block diagram of a PV generator that can be used to implement the PV generator illustrated in FIG. 4.

DETAILED DESCRIPTION

Techniques are described for regulating the voltage provided by a photovoltaic generator in a photovoltaic system. For example, a photovoltaic system includes a photovoltaic generator (also referred to herein as a solar cell array) that includes photovoltaic cells arranged in strings. A configurable string controller can detect events where the voltage produced by the photovoltaic generator should be regulated and selectively connect or disconnect the strings to regulate the voltage provided by the photovoltaic generator.

The controllable string combiner can monitor the power provided by the PV generator and determine whether the amount of power being provided by the PV generator exceeds the capacity of a power sink or whether the PV voltage exceeds a safety level of a power converter that converts the PV voltage from DC to AC current. The power sink can be the electrical grid, and the controllable string combiner can monitor the current capacity of the grid. The controllable string combiner can selectively disconnect the strings of PV cells to reduce the PV voltage if the PV voltage exceeds the capacity of the power sink and/or exceeds a safety level associated with the power converter.

Figure 4:
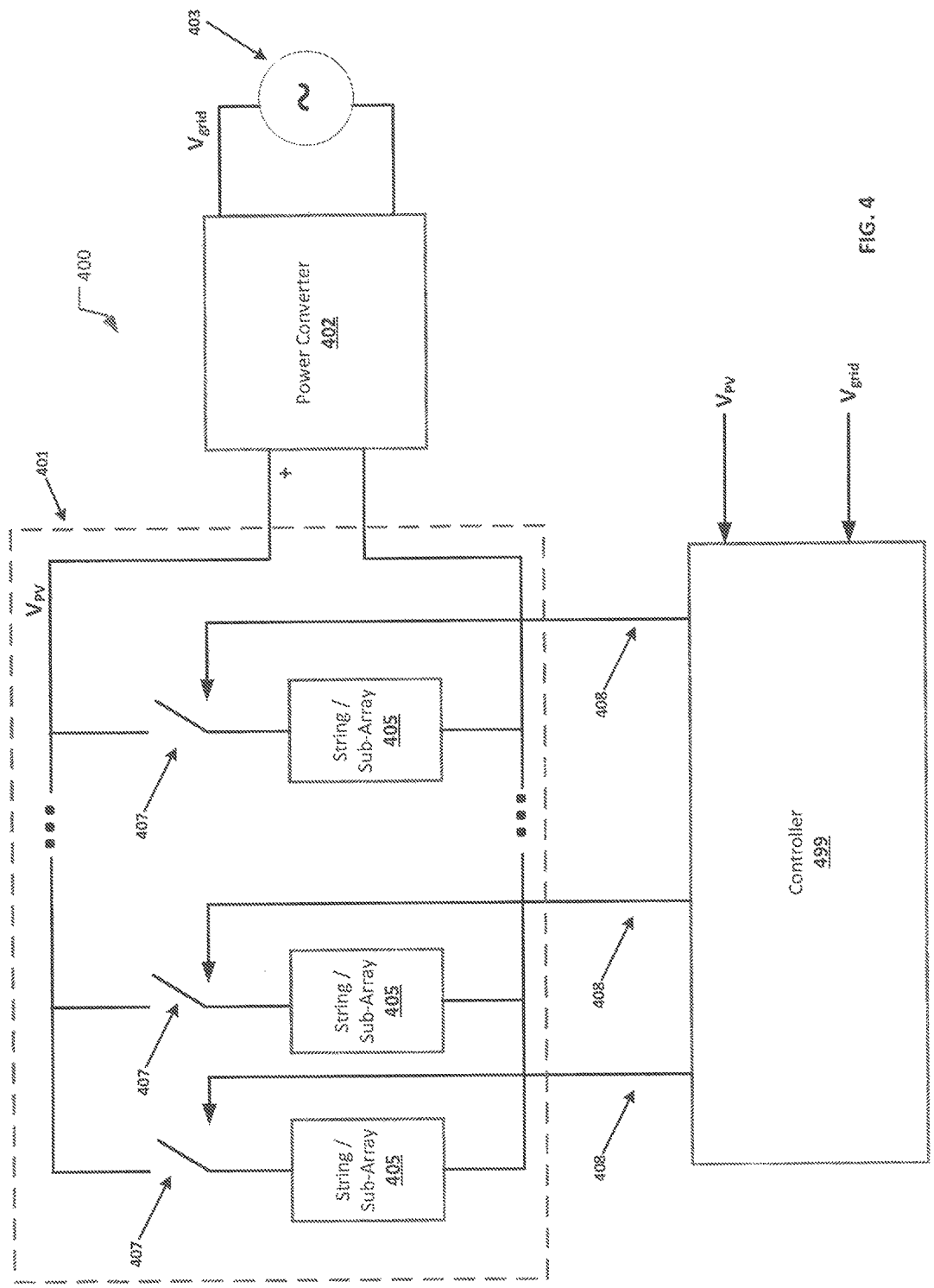
FIG. 4 is a block diagram of a photovoltaic system with a controller configured to control strings of the photovoltaic generator.

FIG. 4 is a block diagram of a photovoltaic system 400 that can be used to implement the systems and methods described herein. A PV generator 401 in the photovoltaic system 400 is divided into PV generator strings 405 that can be selectively connected or disconnected from a power converter 402 (also referred to herein as an inverter) by a controller 499 (also referred to herein as a controllable string combiner) in order to control the PV voltage. Each string 405 comprises one or more electrically interconnected solar cells and, while each labeled the same, may be different from each other.

Figure 14:
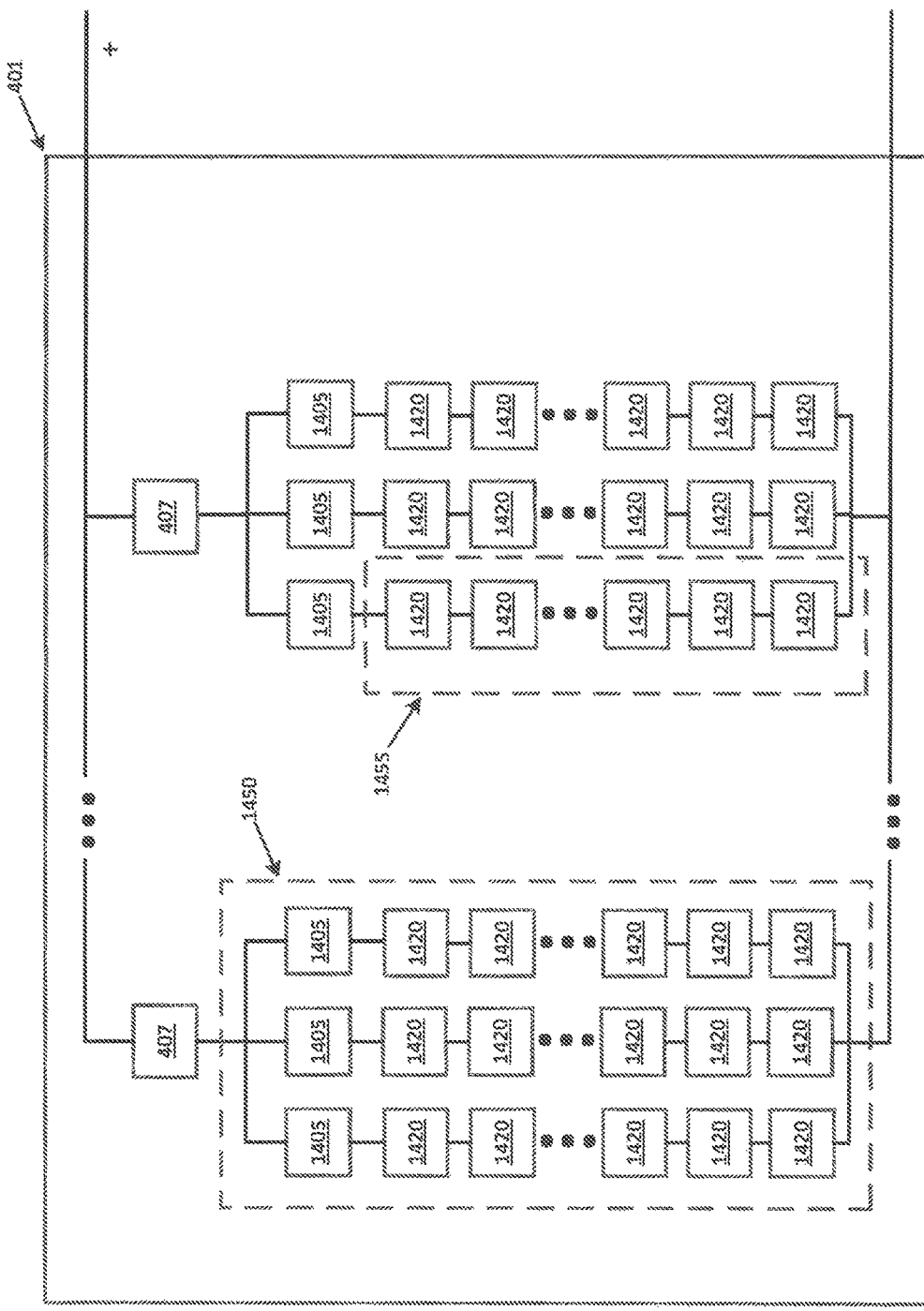
FIG. 14 is a block diagram of a PV generator that can be used to implement the PV generator illustrated in FIG. 4.

FIG. 14 illustrates an example configuration of a PV generator that can be used to implement PV generator 401 illustrated in FIG. 4. The PV generator comprises PV panels 1420 arranged into strings, with each PV panel 1420 including one or more PV cells. Each string can include a fuse 1405. The fuse 1405 can isolate a faulted string from the rest of the PV system 400 in the event that a fault occurs in the string.

A string comprises a series of electrically interconnected PV panels 1420. A string can include a one-dimensional array 1455 of PV panels, such as the array 1455, and multiple one-dimensional arrays can be combined to form two-dimensional arrays, such as the array 1450. From the perspective of the power converter 402, the set of interconnected one and/or two dimensional arrays represents the PV generator 401.

FIG. 14 illustrates an embodiment where each switch 407 is associated with a two-dimensional array of PV panels and the controller 499 can operate a switch 407 to connect or disconnect the two-dimensional array of PV panels associated with that switch 407. FIG. 15 illustrates another embodiment of the PV generator 401 where each switch 407 is associated with a one-dimensional array of PV panels, and the controller 499 can operate a switch 407 to connect or disconnect the one-dimensional array of PV panels associated with that switch 407.

The amount of power that each of the strings can generate depends on the implementation. For example, the number of PV panels 1205 included in a string can vary. For example, in some implementations, the amount of power generated by a string may range from 1 kilowatt (kW) to 3 kW. PV generators 401 can include many hundreds of individual strings. Additionally, a large 1 megawatt (MW) inverter could be used with a PV generator that includes hundreds of strings.

Returning now to FIG. 4, the power converter 402 converts direct current (DC) power provided by the PV generator 401 into alternating current (AC) power that can be provided to power sink 403. The power sink 403 may comprise the electrical power grid and/or a microgrid that provides a localized grouping of electrical generation, storage, and loads. For example, the PV system 400 may be part of a microgrid that is designed to provide power for a university campus, an industrial complex, or other location where a localized generation of power is used to provide at least a portion of the electrical power.

The controller 499 is connected to switches 407. Each switch 407 is associated with a string 405 of the PV generator and can be controlled by the controller 499 via a control connection 408. The control connections 408 can be either a wired or wireless connection that allows the controller 499 to send control signals to the switches 407 to connect or disconnect the string associated with the switch 407. Each of the switches 407 can be a solid state relay that can respond to a control signal received via control connection 408 to connect the string 405 associated with that switch 407 to the converter 402 or disconnect the string 405 from the converter 402. For example, the switches 407 can be implemented using solid state relays produced by Schneider Electric. Controller 499 can be configured to selectively connect or disconnect strings until the capacity of the power sink or until the PV voltage is low enough and safe for the power converter.

While the system 400 includes three strings 405, different numbers of strings that make up the PV generator can be used. The greater the number of strings into which the PV generator is divided, the greater the level of granularity of control that the controllable string combiner 499 can have for adjusting the PV voltage. In finer-grained systems, where PV generator is divided into a larger number of controllable strings 405, the controller 499 can make finer adjustments to the PV voltage by connecting or disconnecting the strings 405. In contrast, in coarser-grained implementations, where the PV generator is divided into a smaller number of controllable strings 405, the controller 499 can make more coarse adjustments to the PV voltage by connecting or disconnecting the strings 405.

The controller 499 can be configured to monitor the capacity of the power sink 403 and to react to changes in the capacity of the power sink by temporarily disconnecting a number of strings of PV cells from the PV generator until the PV capacity increases. The controller 499 can also be configured to identify and respond to various types of events that can cause drops in the capacity of the power sink or increases in the PV voltage output by the PV generator 401. Some examples include: (1) grid support operations during low voltage ride through (LVRT) events; (2) overproduction of PV power due to cloud edge effects; and (3) mandatory power ramp up features during converter start-up period. These are just a few examples of the types of events to which the configurable string combiner can respond and are not intended to limit the use of the configurable string combiner to these specific events. The configurable string combiner can be configured to respond to other types of events that cause changes the in the PV voltage and/or the capacity of the power sink.

As described above, the controller 499 can be configured to adjust the PV voltage during an LVRT event. An LVRT event occurs when the voltage of the grid is temporarily reduced. This reduction is typically due to a fault or load change in the grid. During the LVRT event, the voltage may decrease on one, two, or all three phases of the AC power grid. As the grid voltage decreases, the controller 499 can selectively disconnect strings from the PV generator to decrease the PV voltage. Once the LVRT event passes, the controllable string combiner can reconnect the disconnected strings as the grid capacity returns. The method illustrated in FIG. 11 can be implemented by controller 499 and can be used for responding to an LVRT event.

The controller 499 can also be configured to adjust the PV voltage in response to cloud edge effects. Cloud edge effects can cause a sudden increase in the PV voltage as the amount of sunlight reaching the PV generator increases as the cloud passes overhead. The controller 499 can selectively disconnect strings from the PV generator 401 to reduce the PV voltage to a level that is safe for the voltage converter and is within the capacity of the power sink. Cloud edge effects are typically short-lived effect that produces spikes in PV voltage as an edge of the cloud passes over the PV generator 401. The controller 499 can be configured to monitor the PV voltage and to reconnect one or more of the disconnected strings as the cloud edge effect passes. The method illustrated in FIG. 12 can be implemented by controller 499 and can be used for responding to an increase in PV voltage resulting from cloud edge effects.

The controller 499 can also be configured to adjust the PV voltage by selectively disconnecting strings of PV cells from the PV generator during the startup period for the voltage converter. The voltage converter may require an initial start-up period during which the PV voltage must be ramped up gradually. The controller 499 can gradually ramp up the PV voltage by selectively connecting strings of PV cells of the PV generator to gradually increase the PV voltage during the startup period. The method illustrated in FIG. 13 can be implemented by controller 499 and can be used for gradually ramping up the PV voltage during the startup period of the inverter.

Figure 10:
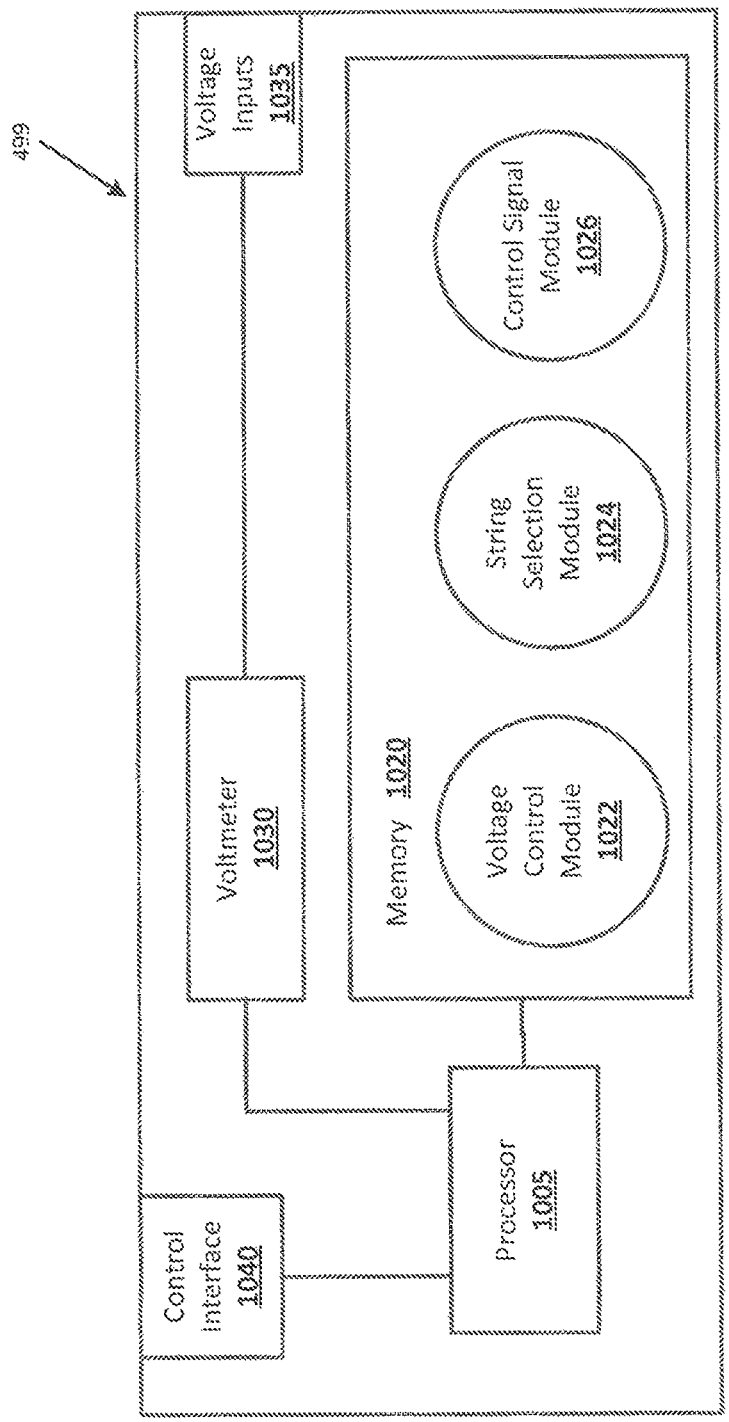
FIG. 10 is a block diagram of a controller for the photovoltaic system shown in FIG. 4.

FIG. 10 is a block diagram of a string combiner controller that can be used to implement controller 499 illustrated in FIG. 4. Controller 499 includes a processor 1005, memory 1020, voltage inputs 1035, voltmeter 1030, and control interface 1040. The memory 1020 includes a voltage control module 1022, a string selection module 1024, and a control signal module 1026. The memory 1020 can comprise one or more types of tangible, non-transitory computer-readable memory, such as random-access memory (RAM), read-only memory (ROM), flash memory, or a combination thereof. The modules can comprise processor-executable instructions that can be executed by processor 1005.

The processor 1005 can comprise one or more microprocessors configured to access memory 1020. The processor 1005 can read data from and write data to memory 1020. The processor 1005 can also read executable program code from memory 1020 and execute the program code.

The voltage inputs 1035 provide an interface through which the controller 499 can monitor voltages throughout the photovoltaic system 400. For example, the voltage inputs 1035 can be used to monitor the grid voltage ($V_{grid}$) and/or the PV voltage ($V_{PV}$), the voltage generated by the PV generators. Voltmeter 1030 can be used to determine the voltage of the various inputs being monitored using the voltage inputs 1035. The voltmeter 1030 may be an external voltmeter and the controller 499 can be configured to receive a signal from the external voltmeter that monitors the grid voltage and/or the PV voltage.

The processor 1005 can send control signals to one or more external devices via control interface 1040. For example, control interface 1040 can be connected to control connections 408 that can be used to control the switches 407. The control interface 1040 can send a control signal 1040 to a switch 407 associated with a particular string 405 of the PV generator 401 to connect or disconnect that string in order to control the overall PV voltage being provided by the PV generator 401. Control interface 1040 can be configured to provide wired connections, wireless connections, or a combination thereof for controlling the switches 407 via the control connections 408.

The voltage control module 1022 can be configured to monitor the grid voltage and/or the PV voltage to identify various events, such as LVRT events, cloud edge effects, and/or other events and to respond to these events by selectively disconnecting or connecting strings of the PV generator to control the voltage provided by the PV generator. The voltage control module 1022 can be used to implement the methods illustrated in FIGS. 11 and 12. The voltage control module 1022 can be configured to make a determination whether one or more strings of the PV generator 401 should be connected or disconnected. The voltage control module 1022 can send a command to the string selection module 1024 to disconnect or connect one or more strings of the PV generator 401 in order to regulate the PV voltage.

The control signal module 1026 can include executable code that can cause the processor 1005 to instruct the control interface 1040 to send a command to one or more external devices, such as the switches 407. For example, the control signal module can send a signal to a switch 407 instructing the switch 407 to connect or disconnect the string associated with that switch. The control signal module 1026 can receive commands from the string selection module 1024 to send commands to one or more external devices, such as the switches 407.

The string selection module 1024 can be configured to select one or more strings of the PV generator 401 to be connected or disconnected in order to adjust the PV voltage provided by the PV generator 401. The string selection module 1024 can also be configured to keep track of which strings are currently connected and which are currently disconnected. The string selection module 1024 can maintain a string map memory 1020 that indicates whether each of the strings comprising the PV generator 401 are connected or disconnected. The string selection module 1024 can be configured to update the map as the strings are connected or disconnected to adjust the voltage. The string selection module can also be configured to send a command to the control signal module 1026 to connect or disconnect one or more strings of the PV generator 401 in order to regulate the PV voltage.

Figure 11:
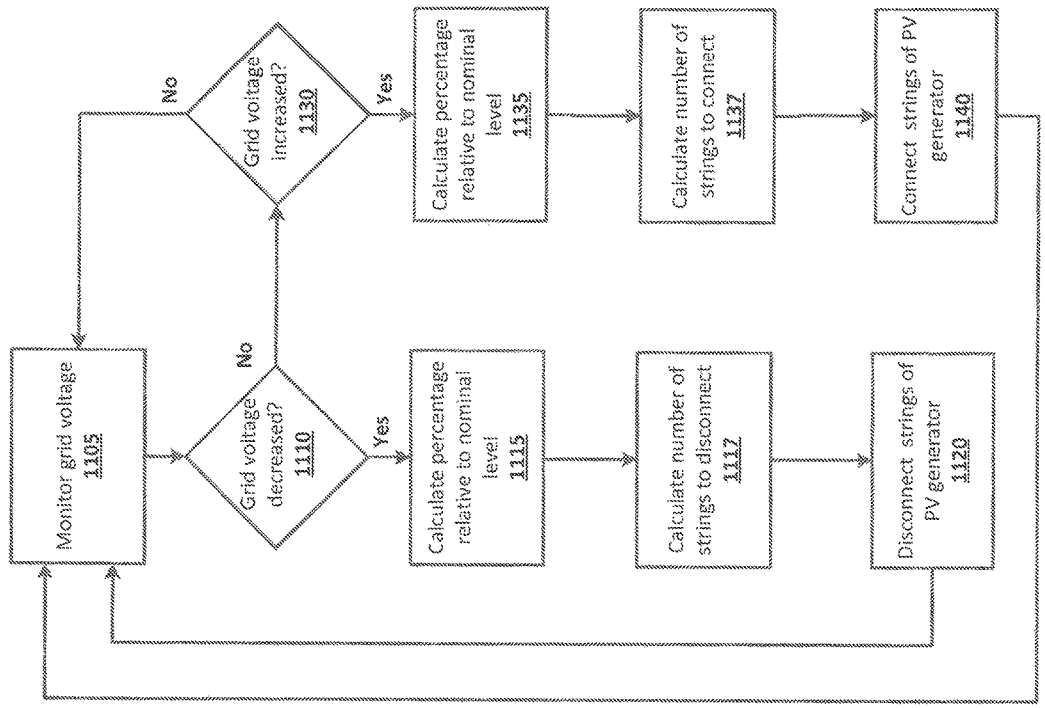
FIG. 11 is a flow diagram of a method for regulating photovoltaic voltage provided by a photovoltaic generator of the photovoltaic system illustrated in FIGS. 4 and 5.

FIG. 11 is a method for controlling the PV voltage output by the PV generator based on the grid voltage. The stages of the method illustrated in FIG. 11 can be implemented by the voltage control module 1022 of controller 499 unless specified otherwise. The method illustrated in FIG. 11 can be performed by controller 499 when responding to an LVRT event. The method illustrated in FIG. 11 can be used by the controller 499 to respond to any changes in grid voltage and is not limited to just responding to LVRT events.

The grid voltage can be monitored to determine whether there are any changes in the grid voltage that may require the PV voltage to be adjusted (stage 1105). The voltage control module 1022 of the controller 499 can be configured to monitor the grid voltage.

The controller 499 can then make a determination whether the grid voltage has decreased (stage 1110). If the grid voltage decreases, the photovoltaic system can make a corresponding decrease in the PV voltage to reduce stress on the power converter 402.

If grid voltage decreased, the percentage of the grid voltage compared to a nominal grid voltage can be calculated (stage 1115). The current grid voltage can then be divided by nominal grid voltage to determine what percentage of the nominal voltage the grid voltage is:

Percentage of nominal voltage=$V_{GRID}/V_{NOM}$

The nominal voltage represents a presumed voltage at which the grid is expected to be operating. Certain events, such as LVRT events, can cause the grid voltage to decrease below the nominal voltage.

The percentage of the nominal voltage can then be used to determine a number of strings to be disconnected (stage 1117). A percentage of the number of strings comprising the PV generator 401 to be disconnected can be determined:

Percentage of strings to disconnect=100%−Percentage of nominal voltage

For example, if the grid voltage is 70% of the nominal voltage, then the grid voltage is 30% less than the nominal voltage. Therefore, 30% of the strings of the PV generator can be disconnected to reduce the PV voltage to 70% of the total PV voltage. The string selection module 1024 can keep track of how many strings are currently connected or disconnected and which strings are connected or disconnected. If the total number of strings that are currently disconnected ($N_{disc}$) is less than the total number of strings that should be disconnected ($X_{disc}$) based on the decrease in grid voltage, the string selection module 1024 can determine the number of strings to be disconnected ($S_{disc}$) by subtracting the number of strings that are currently disconnected ($N_{disc}$) from the number of strings that should be disconnected ($X_{calc}$).

$S_{disc}=X_{disc}-N_{disc}$

If the number of strings to be disconnected is greater than zero, the controller 499 can send a control signal to the switches 407 associated with the strings 405 to be disconnected to cause the strings to be disconnected (stage 1120). The string selection module 1024 can maintain a map of which strings are connected and which strings are disconnected, and can be configured to select connected strings to be disconnected, and can update the map of strings to reflect which strings have been disconnected. The voltage generated by the disconnected strings is left in the field with the solar array and is not introduced into the converter. Once the strings have been disconnected, the controller 499 can continue to monitor the grid voltage (stage 1105).

If grid voltage did not decrease, a determination can be made whether the grid voltage increased (stage 1130). If the grid voltage did not increase, then the controller 499 can continue to monitor the grid voltage (stage 1105).

Otherwise, if the grid voltage increased, the percentage of the grid voltage compared to a nominal grid voltage can be calculated (stage 1135). The current grid voltage can then be divided by nominal grid voltage as described above to determine what percentage of the nominal voltage the grid voltage is:

Percentage of nominal voltage=$V_{GRID}/V_{NOM}$

The grid voltage could increase after an LVRT event or other event that causes a drop in the grid voltage has passed. The controller 499 can react to this change in the grid voltage by increasing the number of strings that are connected to allow the PV voltage to increase.

The percentage of the nominal voltage can then be used to determine a number of strings to be connected (stage 1137). A percentage of the number of strings comprising the PV generator to be disconnected can be determined:

Percentage of strings to connect=100%−Percentage of nominal voltage

For example, returning to the previous example described above, if the grid voltage changes from 70% of the nominal voltage to 90% of the nominal voltage, the number of strings of the PV generator that can be connected can be increased from 70% to 90%.

The string selection module 1024 can keep track of how many strings are currently connected or disconnected and which strings are connected or disconnected. If the total number of strings that are currently connected ($N_{conn}$) is less than the total number of strings that should be connected ($X_{conn}$) based on the increase in grid voltage, the string selection module 1024 can determine the number of strings to be disconnected ($S_{conn}$) by subtracting the number of strings that are currently connected ($N_{conn}$) from the number of strings that should be connected ($X_{conn}$).

$S_{conn}=X_{conn}-N_{conn}$

If the number of strings to be connected is greater than zero, the controller 499 can send a control signal to the switches 407 associated with the strings 405 to cause the strings to be connected (stage 1140). The string selection module 1024 can instruct the control signal module 1026 to send a control signal to the switches 407 associated with the strings to be connected. The string selection module 1024 can maintain a map of which strings are connected and which strings 405 are disconnected, and can be configured to select connected strings to be disconnected and to update the map of strings to reflect which strings have been disconnected. The voltage generated by the disconnected strings is left in the field with the solar array and is not introduced into the converter. Once the strings have been disconnected, the controller 499 can continue to monitor the grid voltage (stage 1105).

Figure 12:
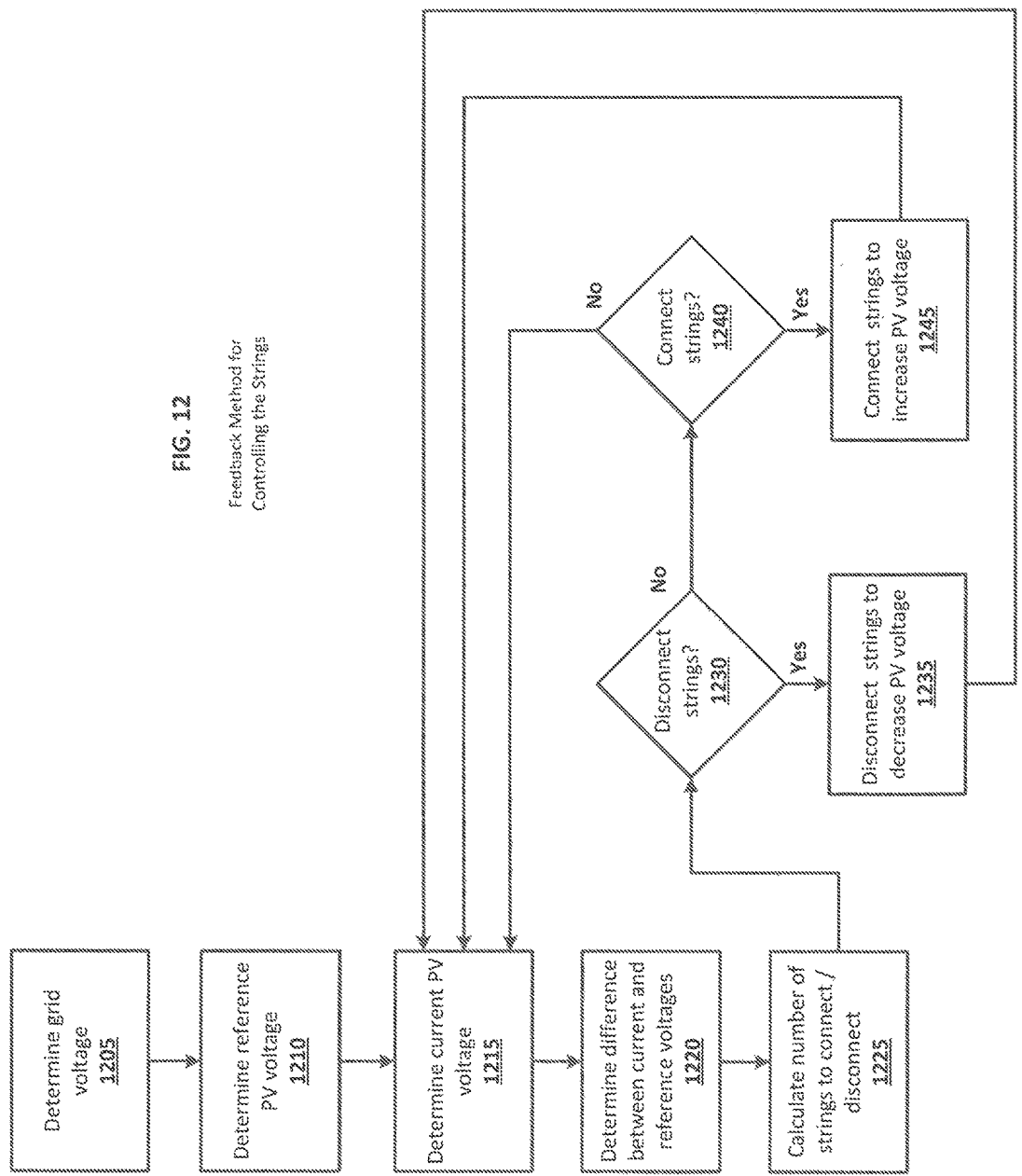
FIG. 12 is another block flow diagram of a method for regulating the photovoltaic voltage provided by the photovoltaic generator of the photovoltaic system illustrated in FIGS. 4 and 5.

FIG. 12 is another method for controlling the PV voltage output by the PV generator 401. The method illustrated in FIG. 12 can be implemented by the voltage control module 1022 of controller 499, unless otherwise specified. The method illustrated in FIG. 12 can be implemented by controller 499 and can be used for responding to an increase in PV voltage resulting from cloud edge effects. The method illustrated in FIG. 12 can be used by the controller 499 to respond to any changes in PV voltage and is not limited to responding to cloud edge effects.

The controller 499 can measure the grid voltage (stage 1205). The voltage control module 1022 of the controller 499 can be configured to measure the grid voltage. The grid voltage can be used to determine a reference PV voltage.

The controller 499 can then determine reference PV voltage ($PV_{ref}$) (stage 1210). The reference PV voltage represents a desired PV voltage to be provided by the PV generator 401 (the solar cell array). The PV voltage can be determined by measuring the grid voltage and determining a PV voltage based on the grid voltage. The controller 499 can determine a desired PV voltage that would result in an output from the power converter 402 that has a voltage that matches or is close to the grid voltage. The PV voltage can be predetermined and can be stored in memory 1020 of the controller 499, and the voltage control module 1022 can access the reference PV voltage stored in memory 1020.

The controller 499 can then determine current PV voltage ($PV_{curr}$) being produced by the PV generator 401 (stage 1215). As described above, the voltage control module 1022 of the controller 499 can be configured measure the PV voltage.

The voltage control module 1022 can then be configured to determine the difference between the reference PV voltage ($PV_{ref}$) and the current PV voltage ($PV_{curr}$).

$$\Delta PV = PV_{ref} - PV_{curr}$$

The voltage control module 1022 can then calculate the number of strings to be connected or disconnected based on the difference between the $PV_{ref}$ and the $PV_{curr}$ (stage 1225). If the current PV voltage is greater than the reference PV voltage, then the value of $\Delta PV$ will be negative, indicating that the controller 499 should disconnect one or more strings to decrease the current PV voltage. If the current PV voltage is less than the reference PV voltage, then the value of $\Delta PV$ will be positive, indicating that the controller 499 should disconnect one or more strings to increase the current PV voltage. If the current PV voltage is equal to the reference PV voltage, then the value of $\Delta PV$ will be zero, indicating that no strings are to be connected or disconnected.

The voltage control module 1022 can determine how many strings should be connected or disconnected based on the value of $\Delta PV$. For example, the value of $\Delta PV$ can be divided by a voltage production amount associated with each of the strings. Each of the strings may be assumed to produce an equal estimated PV, and the $\Delta PV$ can then be divided by the estimated PV to determine how many strings should be connected or disconnected.

Alternatively, the controller 499 can be configured to measure the PV generated by each of the strings and to select one or more strings that could provide approximately the $\Delta PV$ to be connected or disconnected. Where the generated PV voltage from each of the strings is measured, the string selection module can be configured to periodically instruct the control signal module 1026 to measure the PV generated by each of the strings, and the string selection module 1022 can store this information with the map of connected and disconnected strings.

The voltage control module 1022 can then determine whether any strings are to be disconnected based on the number of strings to be connected or disconnected as determined in stage 1225 (stage 1230). For example, if the number of strings is negative, that number of strings should be disconnected, and if the number of strings is positive, that number of strings should be connected.

If the number of strings to be disconnected is greater than zero, the controller 499 can send a control signal to the switches 407 associated with the strings 405 to cause the strings to be disconnected (stage 1235). The string selection module 1024 can maintain a map of which strings are connected and which strings are disconnected, and can be configured to select connected strings to be disconnected, and to update the map of strings to reflect which strings have been disconnected. The voltage generated by the disconnected strings is left in the field with the solar array and is not introduced into the converter. Once the strings have been disconnected, the controller 499 can once again determine the current PV voltage (stage 1215).

If there were no strings to be disconnected, the voltage control module 1022 can determine whether to disconnect any strings based on the number of strings to be connected or disconnected as determined in stage 1225 (stage 1225).

If no strings were to be disconnected, determine whether strings were to be connected (stage 1240). If no strings were to be connected either, then the controller 499 can once again determine the current PV voltage (stage 1215).

Otherwise, if the number of strings to be connected is greater than zero, the controller 499 can send a control signal to the switches 407 associated with the strings 405 to cause the strings to be connected (stage 1245). The string selection module 1024 can maintain a map of which strings are connected and which strings are disconnected, and the string selection module 1024 can be configured to select disconnected strings to be connected and to update the map of strings to reflect which strings have been connected. Once the strings have been disconnected, the controller 499 can once again determine the current PV voltage (stage 1215).

Figure 1:
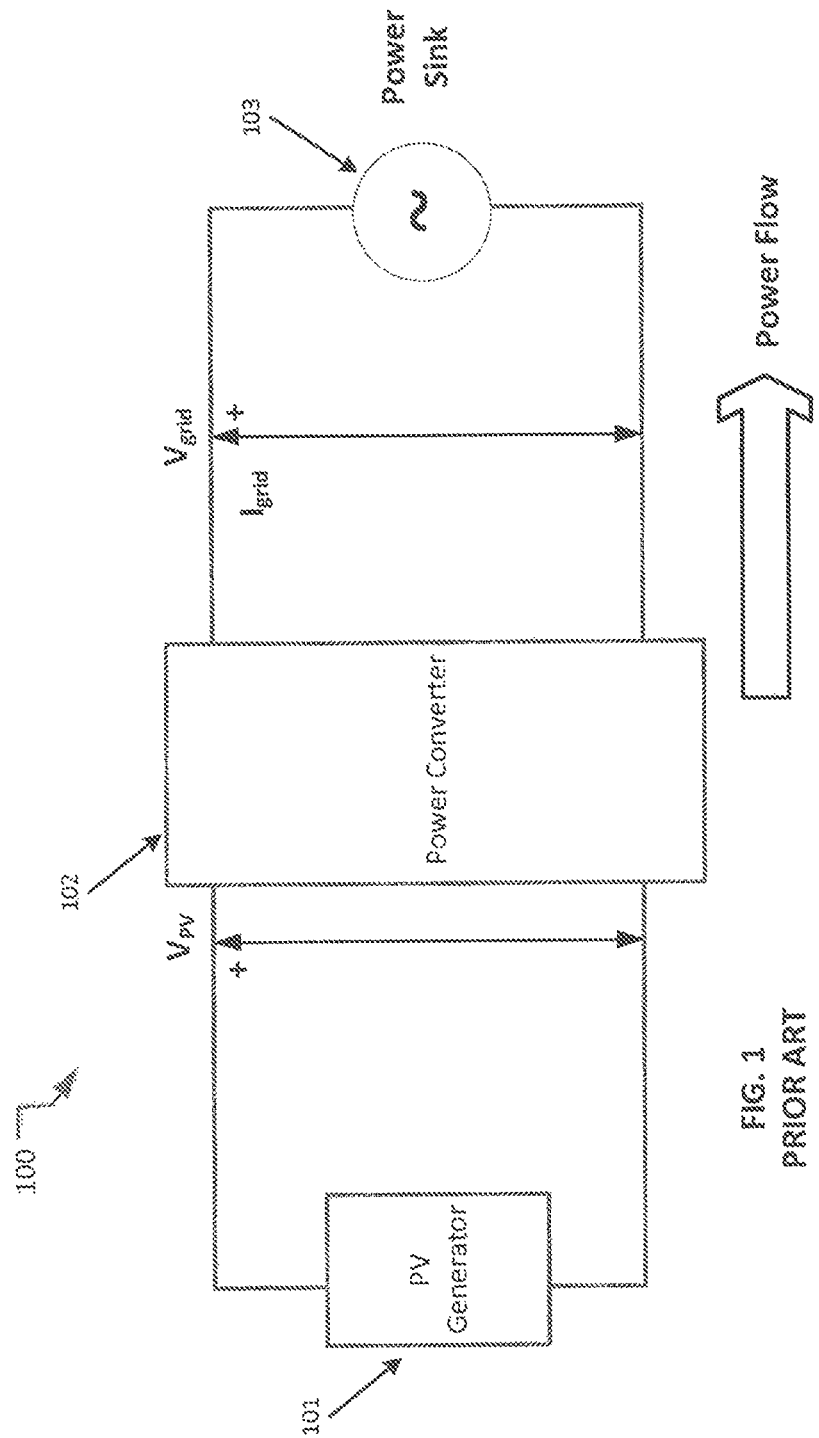
FIG. 1 is a high level block diagram of a conventional photovoltaic system.
Figure 2:
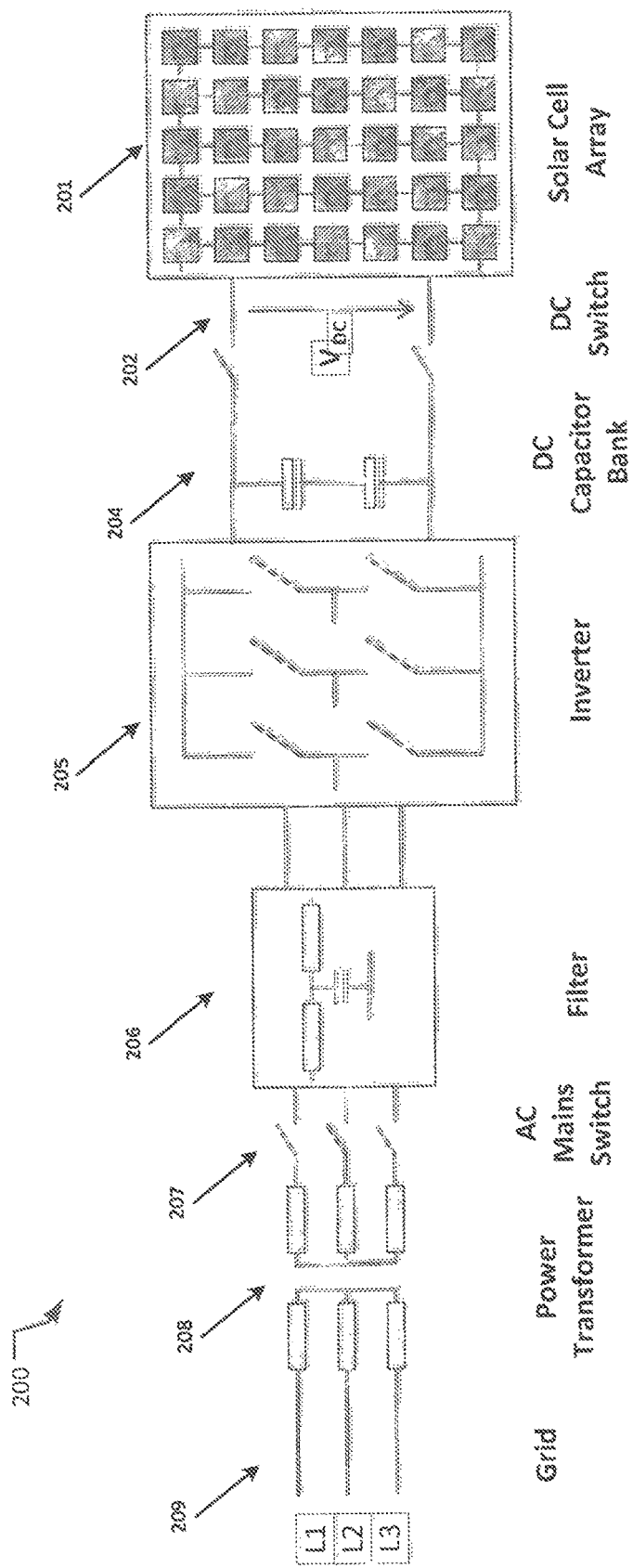
FIG. 2 is a more detailed block diagram of another the conventional photovoltaic system illustrated in FIG. 1.
Figure 3:
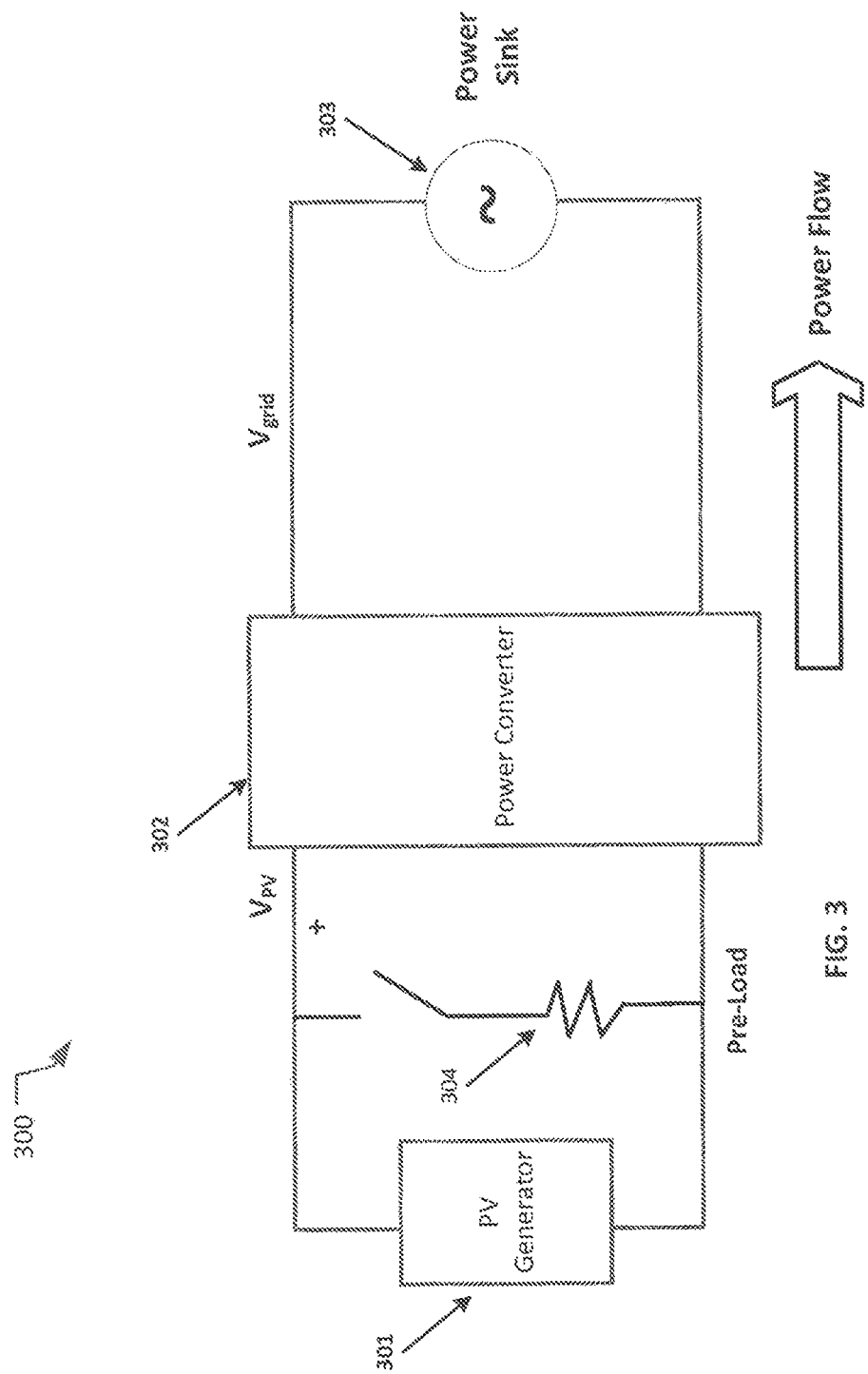
FIG. 3 is a block diagram of another conventional photovoltaic system.
Figure 5:
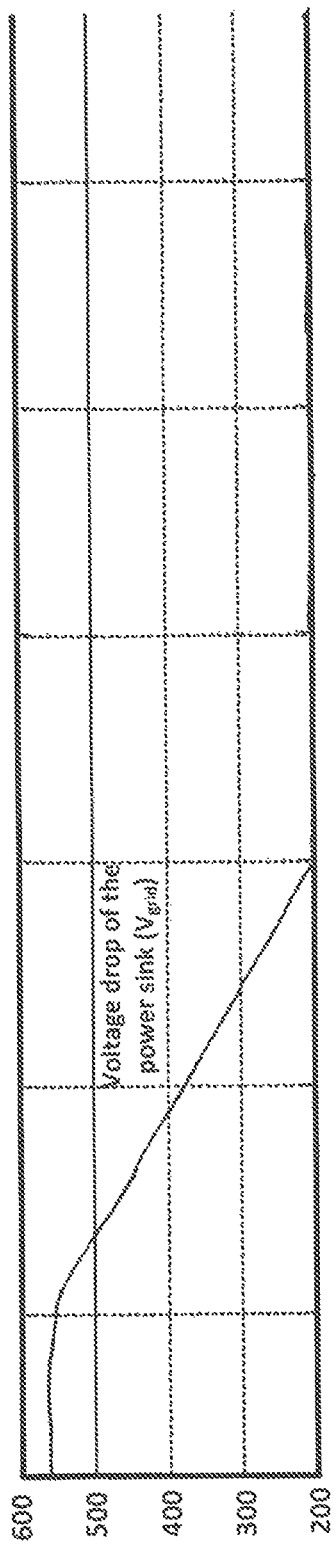
FIG. 5 is a graph of grid voltage during a low voltage ride through (LVRT) event.
Figure 6:
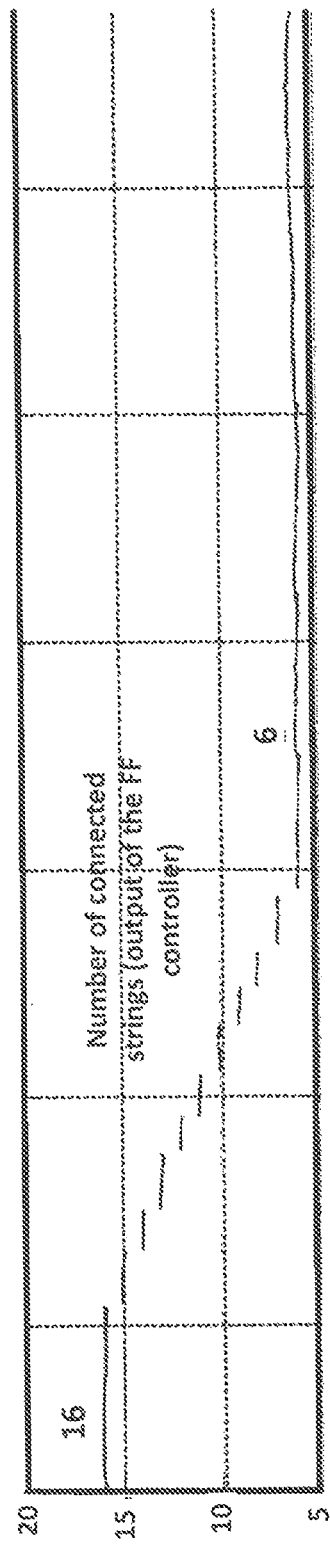
FIG. 6 is a graph of a number of connected strings resulting from a feed-forward response to the LVRT event.
Figure 7:
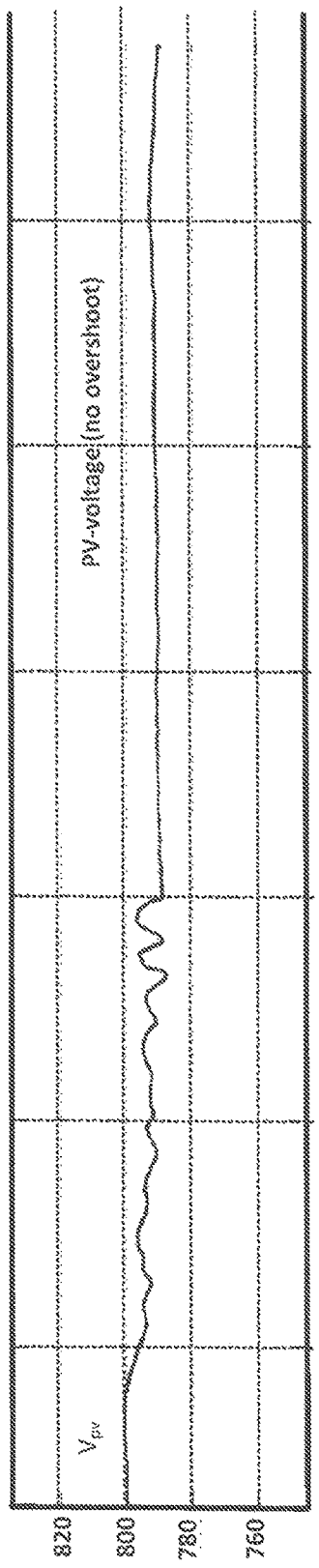
FIG. 7 is a graph of PV voltage during disconnection of PV strings.
Figure 8:
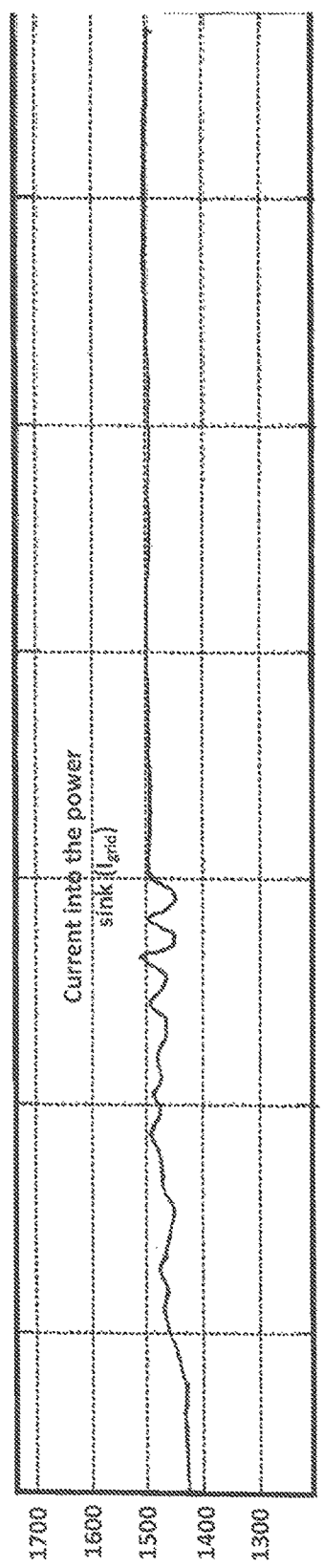
FIG. 8 is a graph of power sink current during disconnection of PV strings.
Figure 9:
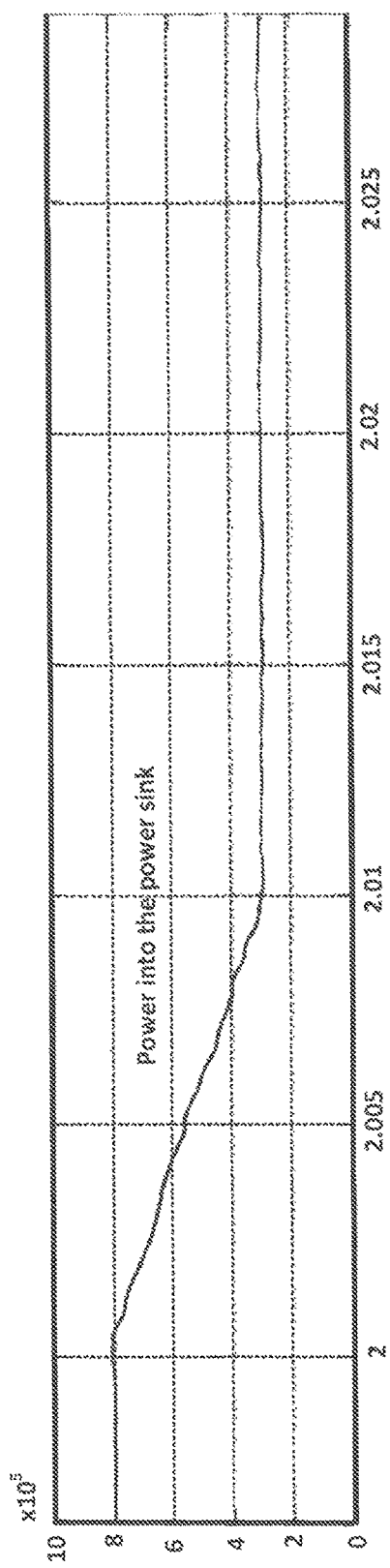
FIG. 9 is a graph of power into a power sink of the system shown in FIG. 4 during disconnection of PV strings.

FIGS. 5-9 are graphs of a simulated of an LVRT event and the response by the string combiner controller 499. FIG. 5 is a graph illustrating a drop in grid voltage as a result of an LVRT event. During the event, the grid voltage dropped to 30% of its initial value. FIG. 6 provides a graph that illustrates a feed-forward response (such as the method illustrated in FIG. 11) to control the number of strings in response to the LVRT event illustrated in FIG. 1. The number of connected strings is decreased as the grid voltage decreases. For example, there were initially 16 strings connected before the LVRT event began. The number of strings was stepped down to 6 strings as the grid voltage continued to decrease. FIG. 7 illustrates that the PV voltage does not overshoot as the load from the power sink (the grid) is removed. FIG. 8 illustrates the current into the power sink ($I_{grid}$) the grid. As can be seen in FIG. 8, the current into the power sink remains relatively constant as the LVRT event continues, because the controller has selectively disconnected strings from the PV generator in response to the decreased grid voltage. FIG. 9 illustrates the decrease in power into the power sink as the strings of the PV generator are selectively disconnected.

Figure 13:
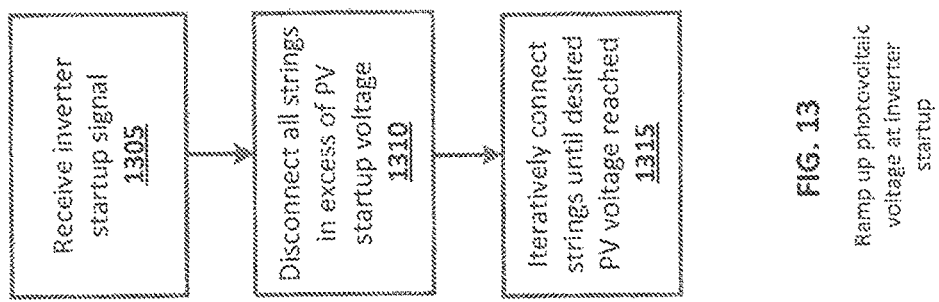
FIG. 13 is a block flow diagram of a method for regulating the voltage provided by the photovoltaic generator during a ramp up period of a power inverter of the photovoltaic system shown in FIG. 4.

FIG. 13 is a method for regulating the voltage provided by the photovoltaic generator during a ramp up period of the power inverter 402 of the photovoltaic system 400. The power converter 402 may have a mandatory power ramp up period while the power converter is being started up. The controller 499 can implement a gradual ramp up of PV power during this mandatory ramp up period. The voltage controller module 1022 can implement the stages of the method illustrated in FIG. 13 unless otherwise indicated.

The controller 499 can be configured to receive an inverter startup signal that causes the controller 499 to gradually ramp up the PV power being provided to the power converter 402 (stage 1305). The inverter can be configured to transmit a message to the controller 499 if the inverter is turned on or reset and requires a mandatory ramp up period. Alternatively, the inverter startup signal can be provided manually by an administrator or technician who has reset the power converter 402. The controller 499 may include a reset button or other interface that allows the controller 499 to be manually reset into the inverter startup mode.

The controller 499 can then reset the PV output to a PV startup voltage by disconnecting all strings 405 of the PV generator in excess of the PV startup voltage associated with the power converter 402 (stage 1310). A value representing the PV startup voltage can be stored in the memory 1020 of the controller 499 and the voltage controller module 1022 can access that value to determine what the PV startup voltage should be for that particular implementation. The voltage controller module 1022 can send a command to the string selection module 1024 to connect the required number of strings used to generate the PV startup voltage and to disconnect any strings in excess of the number required to generate the PV startup voltage. The string selection module 1024 can select the strings to be connected and/or disconnect and send commands to the control signal module to connect or disconnect the strings as necessary.

The controller 499 can then iteratively connect strings to increase the PV voltage provided by the photovoltaic system 400 until a desired PV voltage is reached (stage 1315). The voltage controller module 1022 can be configured to add strings at a predetermined interval until the desired PV voltage is reached. The voltage controller module may calculate these increments based on a ramp up period duration defined for the power converter 402, which can be stored in the memory 1020 of the controller 499 and access by the voltage control module 1022. Furthermore, the interval at which strings are added may be based at least in part on the granularity of the system (the number of strings 405 that comprise the PV generator 401 and the PV voltage generated by each of these strings). The desired PV voltage may be determined using the methods illustrated in FIG. 11 or 12 or can be determined based on other factors, such as the current voltage of the power sink. This iterative process provides the power converter 402 time to ramp up without overloading and possibly damaging the power converter 402 during the startup period.

The various illustrative logical blocks, modules, and algorithm stages described may be implemented as electronic hardware, computer software, or combinations of both. To clearly illustrate this interchangeability of hardware and software, various illustrative components, blocks, modules, and stages have been described above generally in terms of their functionality. Whether such functionality is implemented as hardware or software depends upon the design constraints imposed on the overall system. The described functionality can be implemented in varying ways. In addition, the grouping of functions within a module, block or stage is for ease of description. Specific functions can be moved from one module or block without departing from the disclosure.

The various illustrative logical blocks and modules described can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, multiple microprocessors, one or more microprocessors in conjunction with a DSP core, or any other such configuration.

The operations of a method or algorithm described may be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various changes and modifications could be made to the descriptions provided above without departing from the scope of the disclosure or the appended claims. For example, although elements may be described or claimed in the singular, the plural may be included. Additionally, all or portions of aspects and/or embodiments may be utilized with other aspects and/or embodiments.

What is claimed is:

1. A method for controlling a power output of a photovoltaic system, the photovoltaic system including a photovoltaic generator that comprises a plurality of strings, each string comprising one or more photovoltaic cells, the method comprising:
   monitoring a voltage of a power sink associated with the photovoltaic system;
   calculating a number of strings of the photovoltaic generator to be connected or disconnected, based at least in part upon the voltage of the power sink, wherein disconnecting a string prevents power generated by the string from reaching a power converter of the photovoltaic system that converts direct current (DC) power to alternating current (AC) power expected by the power sink and connecting the string allows power generated by the string to reach the power converter of the photovoltaic system; and
   connecting or disconnecting the number of strings to be connected or disconnected to adjust the photovoltaic voltage provided by the photovoltaic generator.

2. The method of claim 1, further comprising:
   determining whether the voltage of the power sink has increased, and in response to the voltage of the power sink increasing:

calculating the percentage of the voltage of the power sink relative to a nominal level associated with the power sink;

calculating the number of strings of the photovoltaic generator to be connected to increase the photovoltaic voltage provided by the photovoltaic generator; and connecting the number of strings to be connected to increase the photovoltaic voltage provided by the photovoltaic generator.

3. The method of claim 1 wherein the voltage of the power sink decreases as a result of a low voltage ride through (LVRT) event, the method further comprising:

reducing the voltage of the photovoltaic generator by an amount proportional to the decrease in the voltage of the power sink.

4. The method of claim 1 wherein the voltage of the power sink increases after a low voltage ride through (LVRT) event, the method further comprising:

increasing the voltage provided by the photovoltaic generator by an amount proportional to the increase in the voltage of the power sink.

5. The method of claim 1 wherein each of the plurality of strings is associated with a switch, and wherein disconnecting the number of strings to be disconnected to adjust the photovoltaic voltage provided by the photovoltaic generator further comprises sending a first control signal to the switch associated with each of the plurality of strings to be disconnected to disconnect the plurality of strings to be disconnected from the power converter.

6. The method of claim 5 wherein connecting the number of strings to be connected to adjust the photovoltaic voltage provided by the photovoltaic generator further comprises sending a second control signal to the switch associated with each of the plurality of strings to be connected to connect the plurality of strings to be connected to the power converter.

7. The method of claim 1 wherein calculating a number of strings of the photovoltaic generator to be connected or disconnected comprises:

determining a reference voltage for the photovoltaic generator based at least in part upon the voltage of the power sink, the reference voltage representing a desired voltage for the photovoltaic generator;

determining a current voltage of the photovoltaic generator;

determining a difference between the reference voltage and the current voltage; and calculating the number of strings of the photovoltaic generator to connect or disconnect based on the difference.

8. The method of claim 7 wherein determining a reference voltage for the photovoltaic generator based at least in part upon the voltage of the power sink includes accessing a predetermined photovoltaic voltage stored in memory.

9. The method of claim 1, further comprising:

determining whether the voltage of the power sink has decreased, and in response to the voltage of the power sink decreasing:

calculating the percentage of the voltage of the power sink relative to a nominal level associated with the power sink;

calculating the number of strings of the photovoltaic generator to be connected to decrease the photovoltaic voltage provided by the photovoltaic generator; and disconnecting the number of strings to be connected to increase the photovoltaic voltage provided by the photovoltaic generator.

10. A photovoltaic system comprising:

a photovoltaic generator comprising a plurality of strings, each string comprising one or more photovoltaic cells;

a power converter configured to:

convert direct current (DC) power provided by the photovoltaic generator into alternating current (AC) power; and output the AC power;

a plurality of switches, each switch of the plurality of switches being associated with one of the plurality of strings and being configured to connect the string associated with the switch to the power converter when set to a first setting such that power generated by the string can flow to the power converter and to disconnect the string from the power converter when the switch is set to a second setting; and a controller configured to control a power output provided by the photovoltaic generator by selectively connecting or disconnecting one or more of the plurality of strings of the photovoltaic generator to the power converter, the controller being configured to monitor a voltage of a power sink associated with the photovoltaic system, calculate a number of strings of the photovoltaic generator to be connected or disconnected, based at least in part upon the voltage of the power sink, wherein disconnecting the string prevents power generated by the string from reaching the power converter of the photovoltaic system that converts direct current (DC) power to alternating current (AC) power expected by the power sink and connecting the string allows power generated by the string to reach the power converter of the photovoltaic system, and connect or disconnect the number of strings to be connected or disconnected to adjust the photovoltaic voltage provided by the photovoltaic generator.

11. The photovoltaic system of claim 10 wherein the controller is configured to calculate the number of strings to be connected or disconnected by being further configured to:

determine a reference voltage for the photovoltaic generator based at least in part upon the voltage of the power sink, the reference voltage representing a desired voltage for the photovoltaic generator;

determine a current voltage of the photovoltaic generator;

determine a difference between the reference voltage and the current voltage; and calculate the number of strings of the photovoltaic generator to connect or disconnect based on the difference.

12. The photovoltaic system of claim 11 wherein determining a reference voltage for the photovoltaic generator based at least in part upon the voltage of the power sink includes accessing a predetermined photovoltaic voltage stored in memory.

13. The photovoltaic system of claim 10 wherein the controller is further configured to:

determine whether the voltage of the power sink has decreased, and in response to the voltage of the power sink decreasing:

calculate the percentage of the voltage of the power sink relative to the nominal level associated with the power sink; and calculate the number of strings of the photovoltaic generator to be disconnected to decrease the photovoltaic voltage provided by the photovoltaic generator, based upon the percentage.

14. The photovoltaic system of claim 10 wherein the controller is further configured to:
   determine whether the voltage of the power sink has increased, and in response to the voltage of the power sink increasing:
      calculate the percentage of the voltage of the power sink relative to the nominal level associated with the power sink; and
      calculate the number of strings of the photovoltaic generator to be connected to increase the photovoltaic voltage provided by the photovoltaic generator, based upon the percentage.

15. The photovoltaic system of claim 10 wherein in response to a decrease in voltage of the power sink as a result of a low voltage ride through (LVRT) event, the controller is further configured to reduce the voltage provided by the photovoltaic generator by an amount proportional to the decrease in the voltage of the power sink.

16. The photovoltaic system of claim 10 wherein in response to an increase the voltage of the power sink after a low voltage ride through (LVRT) event, the controller is further configured to increase the voltage provided by the photovoltaic generator by an amount proportional to the increase in the voltage of the power sink.

17. The photovoltaic system of claim 10 wherein each of the plurality of strings is associated with a switch, and wherein disconnecting the number of strings to be disconnected to adjust the photovoltaic voltage provided by the photovoltaic generator further comprises sending a first control signal to the switch associated with each of the plurality of strings to be disconnected to disconnect the plurality of strings to be disconnected from the power converter.

18. The photovoltaic system of claim 17 wherein connecting the number of strings to be connected to adjust the photovoltaic voltage provided by the photovoltaic generator further comprises sending a second control signal to the switch associated with each of the plurality of strings to be connected to connect the plurality of strings to be connected to the power converter.

* * * * *